United States Patent
Belchev

(10) Patent No.: US 6,280,638 B1
(45) Date of Patent: Aug. 28, 2001

(54) APPARATUS FOR CONTINUOUS PURIFICATION OF LIQUIDS, DEWATERING AND DRYING OF THE SEPARATED SOLIDS

(75) Inventor: Belcho Alexandrov Belchev, Komplex "Streibiste"B1.4A Et. A, Sofia (BG), 1404

(73) Assignees: Belcho Alexandrov Belchev, Al Lochem (NL); Patrick George Smithuis, Sofia (BG)

( * ) Notice: Subject to any disclaimer, the term of this patent is extended or adjusted under 35 U.S.C. 154(b) by 0 days.

(21) Appl. No.: 09/319,592
(22) PCT Filed: Oct. 8, 1997
(86) PCT No.: PCT/BG97/00012
§ 371 Date: Aug. 11, 1999
§ 102(e) Date: Aug. 11, 1999
(87) PCT Pub. No.: WO98/25684
PCT Pub. Date: Jun. 18, 1998

(30) Foreign Application Priority Data

Dec. 12, 1996 (BG) ...................................................... 101050

(51) Int. Cl.$^7$ ............................. C02F 11/12; B01D 25/12; B01D 33/76
(52) U.S. Cl. ......................... 210/770; 210/85; 210/196; 210/231; 210/259; 210/400; 210/774; 210/783; 210/805
(58) Field of Search ............................. 210/85, 143, 194, 210/195.1, 224, 225, 230, 231, 223, 257.1, 258, 259, 400, 401, 406, 416.1, 149, 184, 185, 695, 740, 742, 770, 771, 780, 783, 805, 806, 808, 387, 774, 196; 100/38, 113, 115, 194, 196–198, 211

(56) References Cited

U.S. PATENT DOCUMENTS 3,608,610   9/1971   Greatorex et al. .................... 210/185

(List continued on next page.)

FOREIGN PATENT DOCUMENTS 0 263 197   4/1988   (EP) .

(List continued on next page.)

OTHER PUBLICATIONS

Soviet Patent Abstracts, Week 9429, Sep. 7, 1994, Derwent Publications Ltd., London, GB; AN 94240308 XP002059055 & SU 1 813 503 A(Kurgan Automobile Ind Cons Techn Inst), May 7, 1993.

Primary Examiner—Joseph W. Drodge
(74) Attorney, Agent, or Firm—Pennie & Edmonds LLP

(57) ABSTRACT

The invention discloses an improved apparatus for continuous purification of liquids, dewatering and drying of the separated non-filtering solids. The apparatus is intended to be applied for the purification of industrial or household waste liquids, as well water form natural sources, by separating and drying of non-filtering solids. The apparatus can be applied successfully for dewatering and drying of various slurries without the emitting of vapours, dust and other detrimental substances in the atmosphere. The apparatus includes a belt filter (1) with an incorporated filter sector and an elastic thermos-filter press (35). The belt filter ensures a continuous purification of water from different sources by separating the non-filtering solids and detrimental ion components comprised in the water, and ensures their bacterial sterility. The separated non-filtering solids are permanently accumulated in the belt filter, and are mixed with the water fed to be purified forming together a slurry. The thickness of the slurry is permanently increasing. After reaching a definite value of thickness, the slurry is pumped by a thickening cone mounted under the filter sector, and is compressed to be dewatered and dried in the elastic thermo-filter press. The cake compressed in the chambers of the elastic thermo-filter press is dewatered and dried in two stages: The first stage is effected by the pressure of a combined vacuum pressure pump, and the vacuum generated by it second vacuum pressure pump. The second stage is realized simultaneously by the longitudinal shrinkage of the elastic thermo-filter press which squeezes the cake, by extraction of the residual capillary moisture under the action of a "steam jacket" generated by the partially evaporated residual liquid phase, and by the vacuum created by the second vacuum pressure pump. The apparatus can be used Successfully for dewatering and drying different types of slurries, and the power consumption is substantially reduced.

45 Claims, 11 Drawing Sheets

U.S. PATENT DOCUMENTS

| | | | |
|---|---|---|---|
| 4,212,745 | | 7/1980 | Jellesma ................................ 210/401 |
| 4,402,834 | * | 9/1983 | Bastgen et al. ....................... 210/770 |
| 4,999,118 | | 3/1991 | Beltchev .............................. 210/774 |
| 5,143,609 | | 9/1992 | Beltchev .............................. 210/185 |
| 5,193,123 | * | 3/1993 | Stover et al. ........................ 210/185 |
| 5,202,034 | * | 4/1993 | Martel ................................. 210/770 |
| 5,558,773 | | 9/1996 | Aigeldinger et al. ................. 210/770 |

FOREIGN PATENT DOCUMENTS

| | | |
|---|---|---|
| 0 391 091 | 10/1990 | (EP) . |
| 1350234 | 4/1974 | (GB) . |
| WO 94/13382 | 6/1994 | (WO) . |

* cited by examiner

APPARATUS FOR CONTINUOUS PURIFICATION OF LIQUIDS, DEWATERING AND DRYING OF THE SEPARATED SOLIDS

FIELD OF THE INVENTION

The invention relates to an apparatus for continuous purification of liquids, dewatering and drying of the separated non-filtering solids.

DESCRIPTION OF PRIOR ART

No apparatus is known for continuous purification of liquids and dewatering and drying of the separated non-filtering solids in which the non-filtering solids are accumulated in the inflowing liquid to be purified thus forming a mixture (suspension) which is dewatered and dried after reaching a definite density.

(The proposed invention consists basically of functionally interconnected belt filter and elastic thermo-filter press, and we will therefore consider the already known similar apparata.)

A belt filter is known (U.S. Pat. No. 4,212,745, Yellesma) which comprises a filter belt, moving synchronously upon two conveyor belts, located in sequence one after another.

The conveyor belts are sliding on the upper part of two unloading blocks connected to vacuum pumps and outlet pipes effecting the filtration process.

A disadvantage of this belt filter is the complicated synchronization required to be maintained during the movement of the filter and conveyor belts.

Another disadvantage is that in the described structure no hydrostatic pressure can be exerted on the filter belt, which hydrostatic pressure would speed up the filtration process.

A further disadvantage of this belt filter is that only the upper surface of the two unloading blocks is used and thus the capacity of the filtered liquid is reduced significantly.

Still another drawback of this belt filter is that the unloading of the dewatered cake is effected by scraping of the filter belt which lead to a rapid wear of the filter cloth, reduces its operating life and impairs the filtration process.

A belt filter acting by subpressure—vacuum (EP 0391091 A1, Teckentrup, Heinrich) is known, comprising a container of a definite volume, where the suspension to be filtered flows in. A closed chamber connected to the vacuum pump is located on the bottom of the container. There are apertures at the upper portion of the chamber. A drain belt lies over these apertures, and over the drain belt there is a continuous filter belt. The filtered liquid is carried out by vacuum from the closed chamber, and the residual cake on the filter belt is separated by means of a rotating brush ands is disposed of through an appropriate hole.

A disadvantage of the belt filter with subpressure is that only the upper surface of the closed chamber is employed for filtration and therefore the filtering capacity is diminished considerably.

A further drawback of the belt filter with subpressure is that not more than one chamber can be used with it. This leads to a manifold reduction of the amount of filtered liquid and the capacity of the belt filter.

Another disadvantage of the belt filter with subpressure is that it cannot act as a thickener. The filter belt carries the wet cake out and ensures a continuous process. This is unquestionably useful, but the process is accompanied by the following unfavourable technological results:

The wet cake sticking to the filter cloth can be separated with difficulty;

The separation of the cake from the filter cloth is not complete and a layer of fine solids remains which impairs its filtering capacity;

The mechanical separation of the wet cake reduces the filter cloth's operation life;

The produced wet cake cannot be fed further for additional filtration in a filter press where the mode of dewatering is better and a lower final humidity can be achieved.

The obtained wet cake can practically only be dried in an appropriate drier which would cause high costs for heating energy and contamination of the environment by dust and hazardous vapours.

A filter press (U.S. Pat. No. 3,608,610, Greatorex) is known, in which dewatering is carried out in two stages:

The first stage is completed by traditional compression of a given suspension in the chambers of a filter press, and the liquid phase is filtered through the filter belt whereafter cake with a high content of residual liquid phase remains in the chambers.

In the second stage additional dewatering of the cake is achieved, and special elastic hydraulic membranes mounted in the cells of the filter press swell, whereby the volume of the chambers is reduced and thus the residual liquid phase in the cake is driven through the filter belt.

A disadvantage of the filter press is that the elastic membranes are situated opposite to the filter belt and are therefore limiting each filter chamber by an area equal to its filtering area. The residual amount of liquid in the cake driven out by the hydraulic swelling of the membrane is equal to the inflowing amount of hydraulic liquid.

Another disadvantage of the filter press is the expensive and difficult realization of a structural connection between the elastic hydraulic membranes and the supporting surface they are lying upon, because the hydraulic liquid is fed under pressure between the elastic hydraulic membranes and the supporting surface of each filter chamber.

A further disadvantage of the filter press is that no full drying of the cake to the extent of a final dry product can be achieved in it without the need for its additional transportation and drying with the help of appropriate drying equipment.

A method and filter press for dewatering of suspensions and drying of the filtered cake is known (U.S. Pat. No. 4,999,118, and U.S. Pat. No. 5,143,609, B. Beltchev).

The basic element in this apparatus is a filter press with heating and filtering plates. Dewatering and drying in the filter press is effected in two stages:

The first stage is completed after the traditional compressing of a given suspension in the chambers of the filter press, whereas the liquid phase is filtered through the filter plates and cake with a high content of liquid phase remains in the chambers.

The second stage begins by providing power supply to the heating membranes embodied in the heating plates.

The higher temperature of the heating membranes evaporates part of the residual liquid phase in the cake and a "steam jacket" is formed around the heating membranes. Under the impact of the steam pressure, the "steam jacket" drives the residual liquid phase from the capillaries of the cake and in mixture of vapours and liquid thus obtained is drawn under vacuum by means of the filtration plates. The effect generated by the "steam jacket" ensures a considerable lowering of the consumption of heat energy as compared with the known drying apparatuses.

A disadvantage of the method and apparatus for dewatering of suspensions and drying of the filtered cake is that during the second stage the residual liquid in the cake's capillaries is driven out only under the action of the "steam jacket" without providing for additional compression and thickening of the cake in the chambers of the filter press.

Another drawback of the method and apparatus for dewatering of suspensions and drying of the non-filtering cake is that the filter press cannot be effectively used in the process of thickening.

SUMMARY OF THE INVENTION

The aim of the invention is to create an apparatus for continuous purification of liquids and dewatering and drying of the separated non-filtering solids (cake), whereas the liquid to be purified is continuously flowing into the apparatus and the purified liquid is continuously flowing out from it, and the separated non-filtering solids are accumulated in the apparatus and are mixed with the inflowing liquid to be purified and develop a suspension of constantly increasing thickness to reach a predetermined value.

Another objective of the invention is to ensure a rapid dewatering and drying of the suspension which has reached the predetermined value with a minimum power consumption and a minimum industrial floor area.

The task has been solved with an apparatus comprising functionally interconnected belt filter and elastic thermo-filter press. The belt filter consists of feed container, filter sector and thickening cone. The filter sector is located under the feed container, and the thickening cone is linked with its upper portion to the filter sector. The lower part of the thickening cone is connected by means of a fixed unloading pipe, a pipe, a combined vacuum pressure pump and supply pipe to the elastic thermo-filter press. The filter sector is linked by means of an outlet vacuum pipe, a vacuum collector and a main vacuum pipe to a main vacuum pump. At its other side, the filter sector is connected by means of a reducing pipe, a pressure pipe, a second combined vacuum pressure pump, a second vacuum collector and a thermo-fluid detector to the elastic thermo-filter press.

The filter sector comprises a robust frame. In the robust frame are located: a perforated absorption chamber, an elastic box and a perforated drive drum. To the perforated absorption chamber are embodied a gas-impermeable sheathing and a porous chamber partition, whereas a basket filled with absorbent substance is located in the perforated absorption chamber. A sealed cover is fixed to the perforated absorption chamber. A vacuum chamber is shaped by the porous chamber partition and the gas impermeable sheathing. The vacuum chamber is connected to the main vacuum pump through the outlet pipe, the vacuum collector and the main vacuum pipe.

A continuous drain belt is laid through spacer rollers upon the perforated absorption chamber and the gas impermeable sheathing. A belt screen located over the gas impermeable sheathing is connected to the one side of the elastic box, and the perforated drive drum is located at the opposite side of the elastic box.

A second motor reduction gear is connected with the perforated drive drum. The perforated drive drum is connected with a fixed hollow shaft by means of second sealed bearings. The perforated drive drum is connected with the robust frame by sealed bearings. A fixed screen with a horizontal screen slit is mounted concentrically in the interior of the perforated drive drum. The fixed hollow shaft is connected in sequence at its one side through the reduction pipe, the pressure pipe, the second combined vacuum pressure pump, the second vacuum collector and the thermo-fluid detector to the elastic thermo-filter press. The fixed hollow shaft is blind at its second end.

The elastic box comprises a frame, a hard sliding arch and two semi-free sliding arches, mounted one upon another and suspended elastically at their opposite sides to the elastic box. A jack is mounted between the frame and the semi-free sliding arches, whereas a supporting segment is located under the semi-free sliding arches and is connected to the upper part of the jack.

The continuous filter belt encompasses in succession the continuous drain belt, the belt screen, the elastic box and the perforated drive drum. Magnetic fibres are interwoven in the continuous filter belt. Rollers, second rollers and cleaners are mounted upon the external surface of the continuous filter belt. A magnetic detector is fixed in the robust frame.

A control panel is connected with the combined vacuum pressure pump, the second combined vacuum pressure pump, the jack, the magnetic detector, the second motor reduction gear and density detector mounted inside the thickening cone.

The elastic thermo-filter press consists of elastic filter plates, arranged in succession between heating plates following each other. Elastic hollow conduits are laid on both sides of the internal frames of the elastic filter plates. Heating membranes with feed holes are mounted in the heating plates.

A self-propelled head is connected by drive nuts to guide screws located at the one end of robust stems. The robust stems are connected at their other end with pistons. The pistons are laid in hydraulic cylinders, and the hydraulic cylinders are fixed to a fixed head. Hydraulic pipes connect the hydraulic cylinders to a hydraulic pump. The fixed head is connected through fixed couplings with supporting beams.

The self-propelled head, the elastic filter plates and the heating plates are suspended through supporting rolls on the supporting beams. The self-propelled head, the elastic filter plates, the heating plates and the fixed head are interlinked by means of pivots. The elastic filter plates and interconnected by flexible pipes. The elastic filter plates, are connected to a fluid pump through the flexible pipes. The elastic filter plates are connected in their lower part to the second combined vacuum pressure pump through flexible vacuum pipes, the thermo-fluid detector and the second vacuum collector.

The elastic filter plate comprises an internal frame, and a vacuum channel is located in the lower part of the internal frame. The vacuum channel is connected at its external end to the flexible vacuum pipes, and the internal end of the vacuum channel is connected with a vacuum filter chamber of the elastic filter plate. The vacuum filter chamber is limited by the internal frame and two porous partitions. A feed pipe inlet is located in the vacuum filter chamber and in the porous partitions. The feed pipe inlet is connected to the combined vacuum pressure pump by a supply pipe. A fluid channel is located in the internal frame. The fluid channel is connected in its external end with the flexible pipes, and the internal end of the fluid channel is connected with the elastic hollow conduits. The internal frame is embraced by an elastic frame, and the elastic hollow conduits are formed between the internal frame and the elastic frame. The elastic hollow conduits are located on the two parallel and vertical sides of the internal frame.

The control panel is connected with the motor reduction gear, the heating membranes, the fluid pump, the hydraulic pump, the thermo-fluid detector and a control valve.

An advantage of the invention is that filtration is effected continuously under the action of the hydrostatic pressure of the inflowing liquid to be purified and the vacuum generated in the vacuum chamber. Thus the continuous removal of the non-filtering solids and their mixing with the inflowing liquid to be purified takes place in the belt filter itself. The obtained suspension with an ever increasing density can be pumped out at a definite value of thickness, i.e. a thickness that is technologically most advantageous for the filtering and drying process.

Another advantage of the invention is that the continuous filter belt operates completely submerged in the filter sector, and during the filtration process the accumulation on its surface of a thickened layer of non-filtering solids is eliminated. Thus the micropores of the continuous filter belt do not clog, and the cleaning of the perforated drive drum is facilitated. This ensures a stable filtration process and a longer operating life of the continuous filter belt.

A further advantage of the invention is that the effective area of filtration of the continuous filter belt is practically the predominant part of its whole area.

Following the well known hydraulic compression of the suspension, the accumulated cake is subjected to additional mechanical compression, accomplished as a result of the longitudinal shrinking of the elastic thermo-filter press. At this stage the residual capillary liquid is driven out by both the shrinking and the steam of the "steam jacket" generated around the heating membranes. Thus and exceptionally rapid dewatering and drying process is achieved with a very small consumption of energy.

Another advantage of the invention is that the rapid processes of filtration, thickening, dewatering and drying lead to a manifold reduction of both the dimensions of the apparatus and its operational floor space.

An advantage of the invention is as well its capacity to separate simultaneously the hazardous ion components and to provide for bacterial sterilization of water originating from natural or other sources.

With these and other objects in view which will become apparent in the following detailed description, the present invention which is shown only by example, will be clearly understood in connection with the accompanying drawings, in which:

DETAILED DESCRIPTION OF THE PREFERRED EMBODIMENTS

The apparatus for continuous purification of liquids, dewatering and drying of the separated non-filtering solids includes a belt filter 1 and an elastic thermo-filter press 35.

Figure 1:
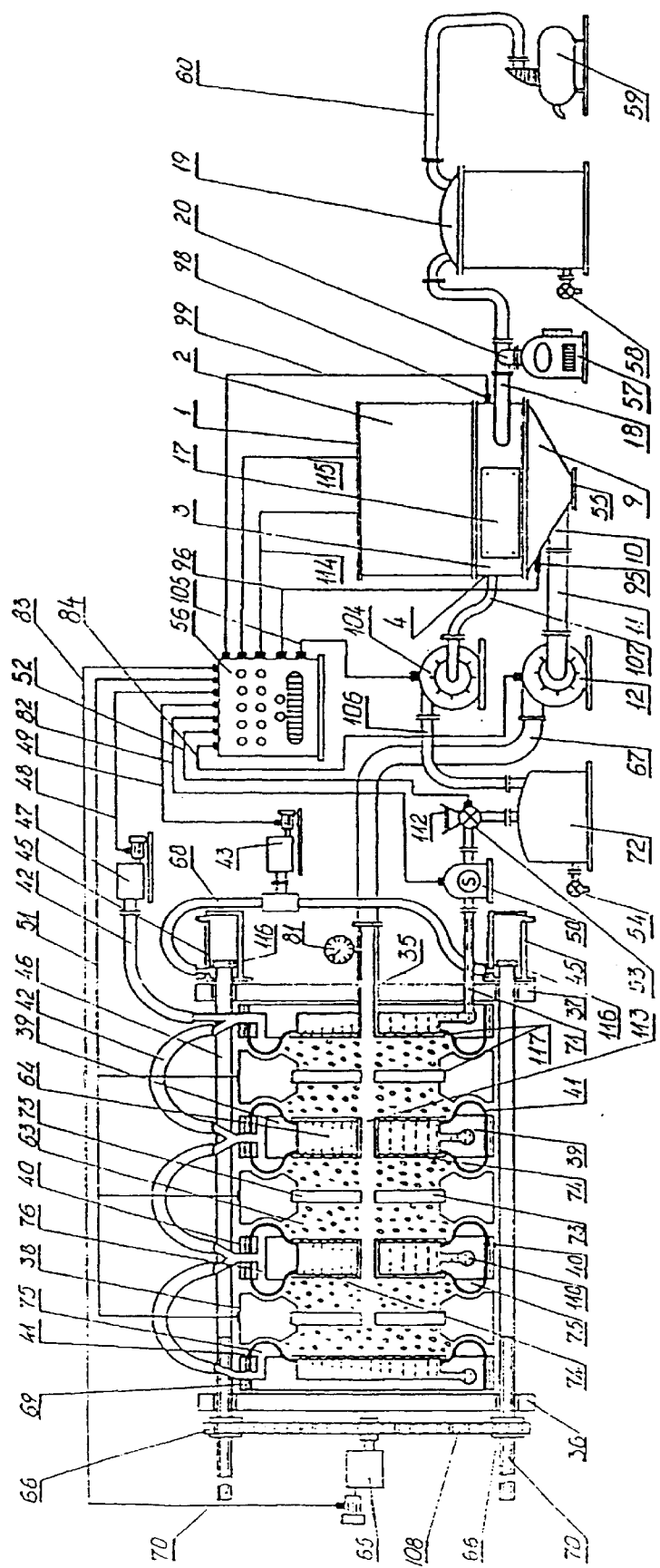
FIG. 1. General view of the functionally interconnected belt filter and elastic thermo-filter press.
Figure 2:
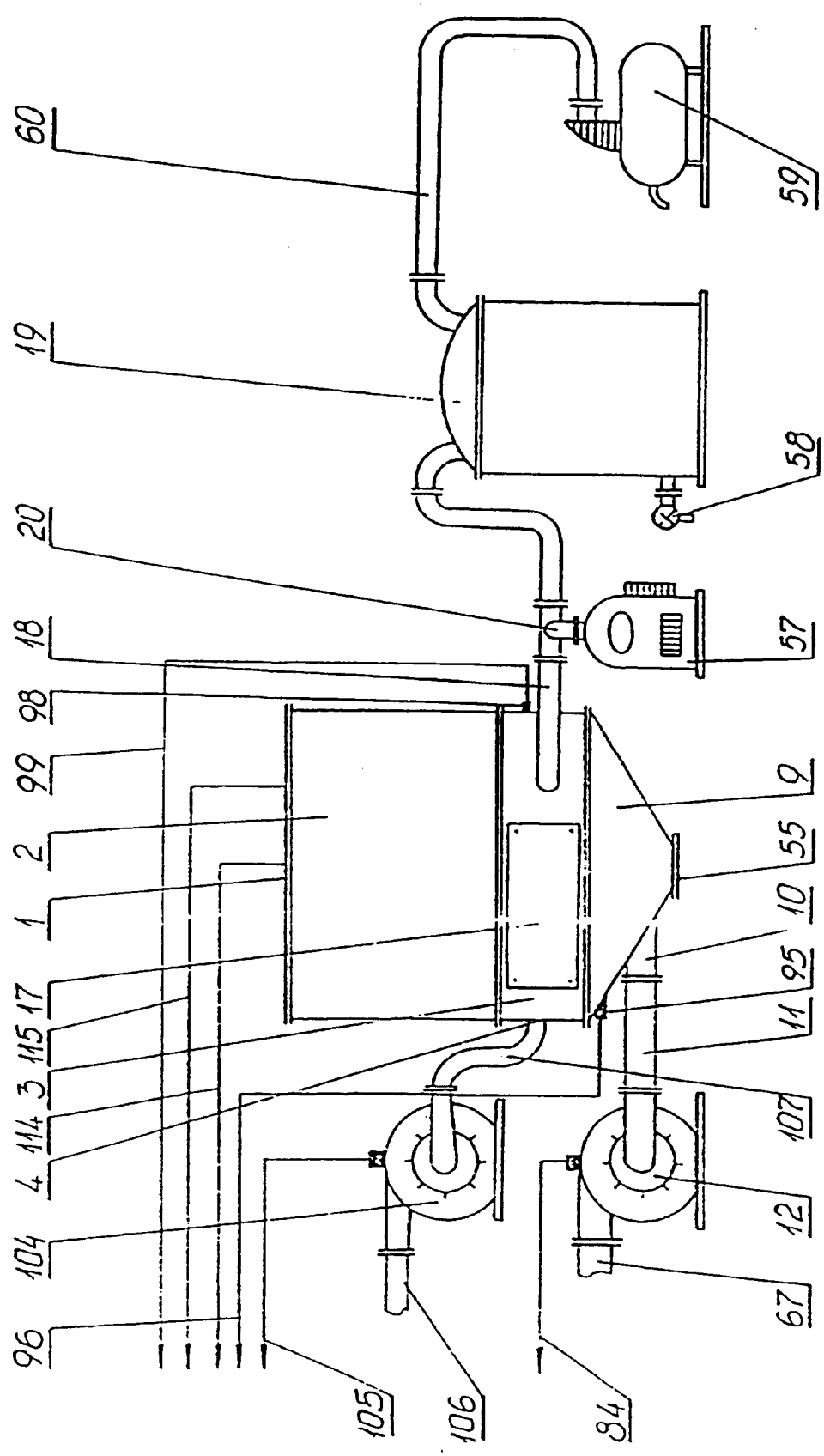
FIG. 2 General view of the belt filter.
Figure 3:
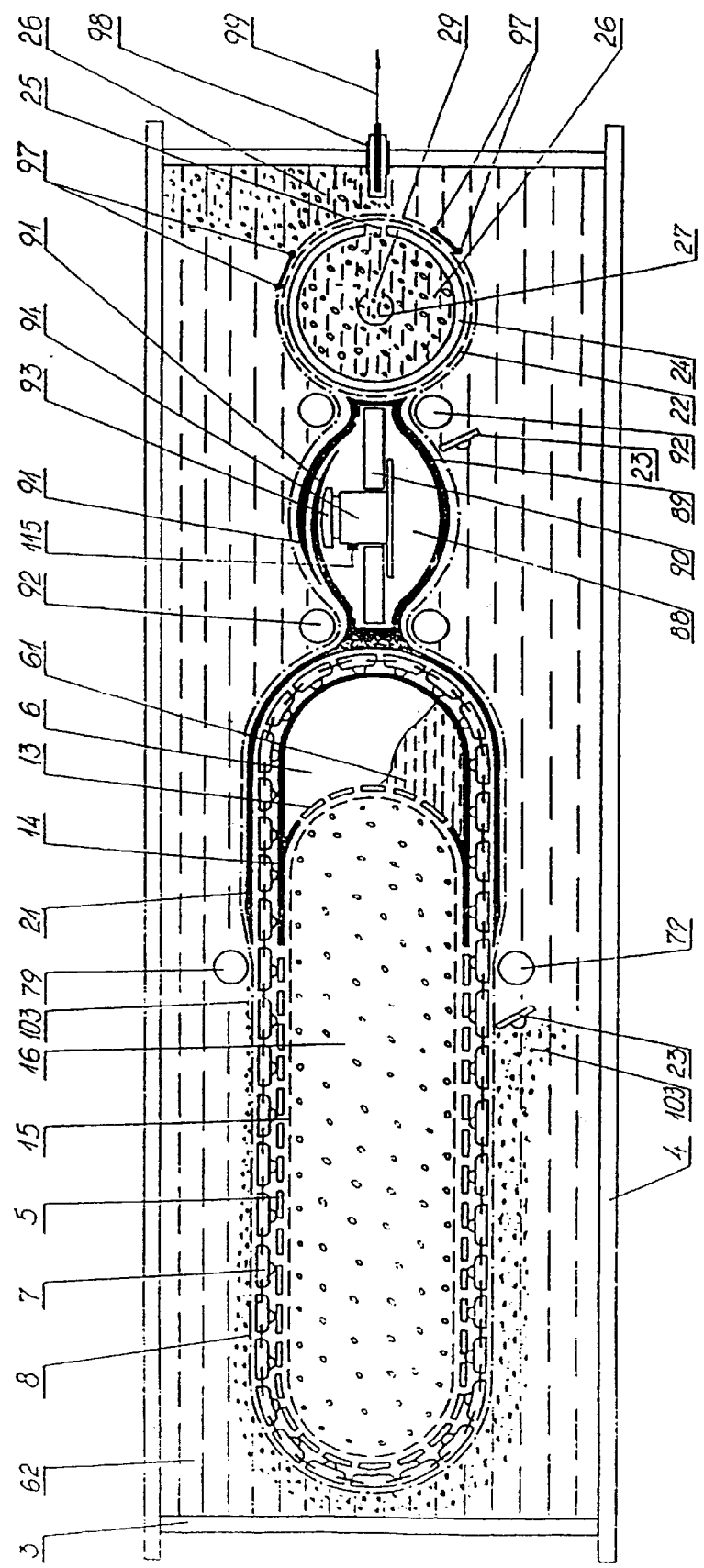
FIG. 3 Diagram of the vertical cross-section of the filter sector.
Figure 4:
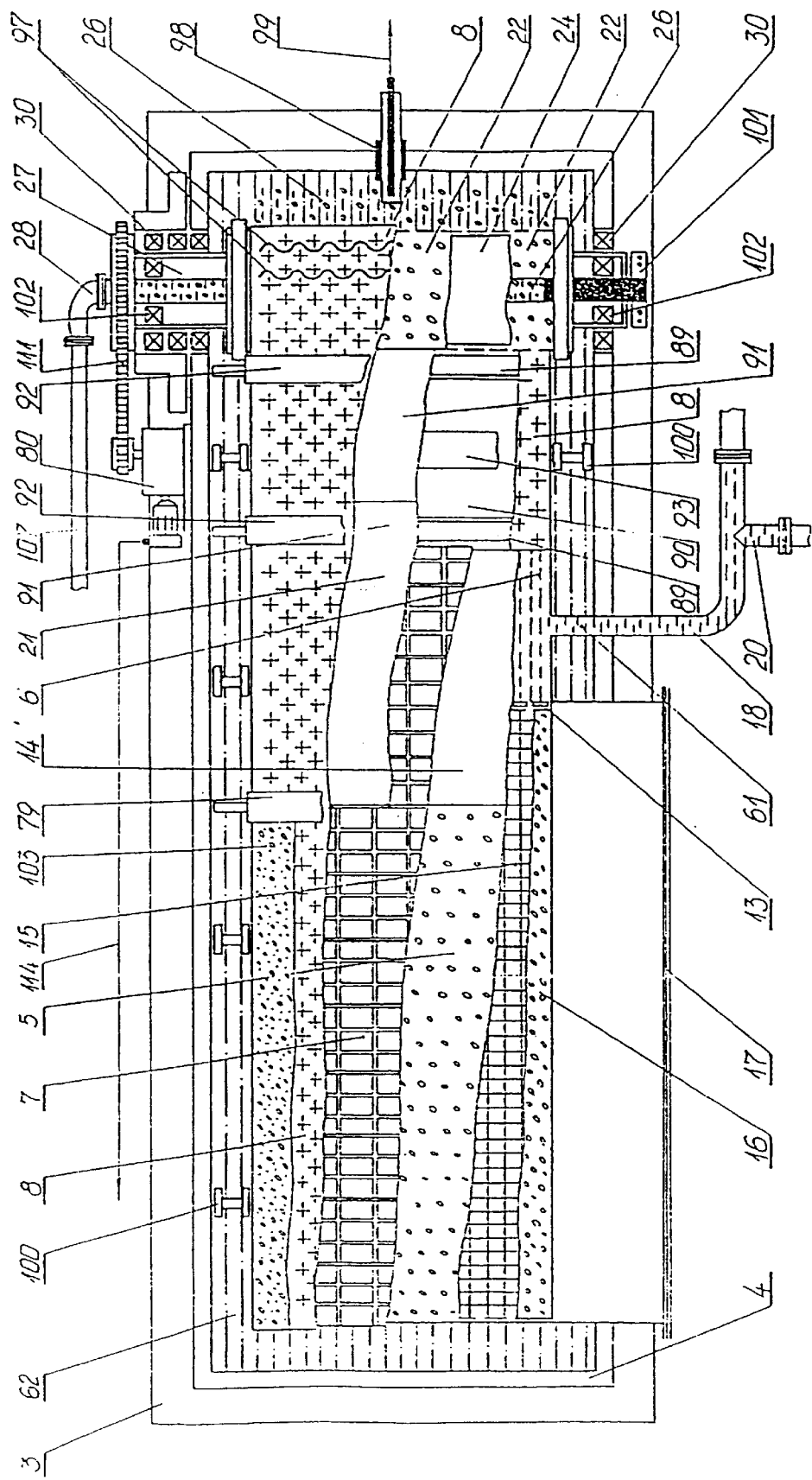
FIG. 4 Diagram of the horizontal cross-section of the filter sector.
Figure 5:
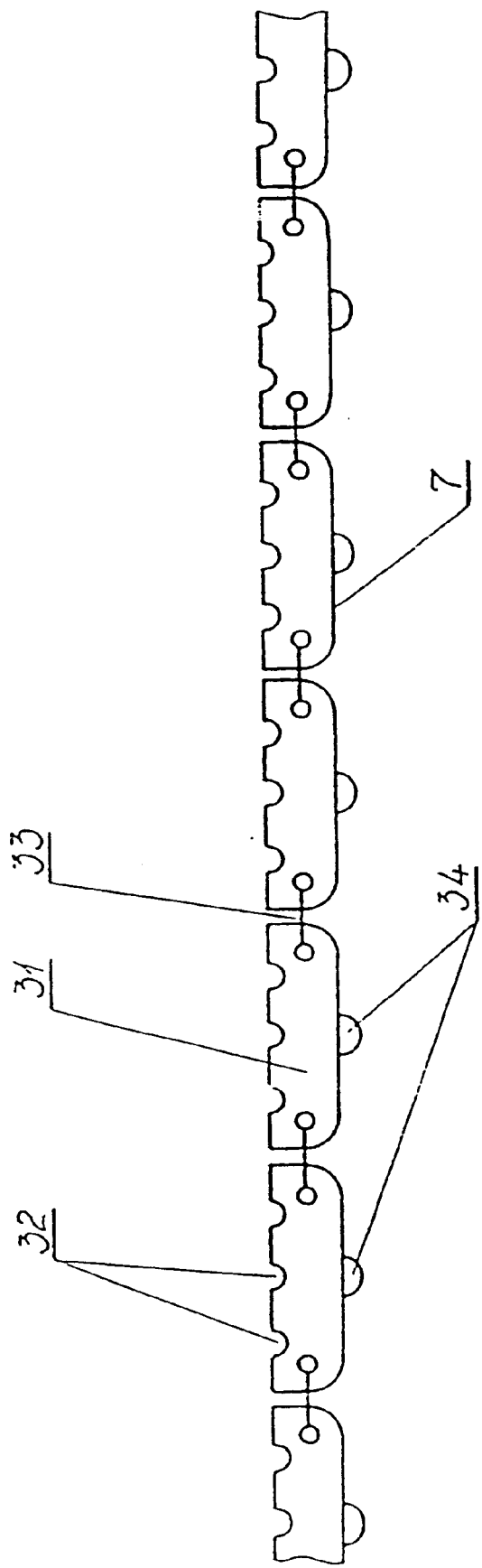
FIG. 5 Diagram of the transverse cross-section of the continuous drain belt.
Figure 6:
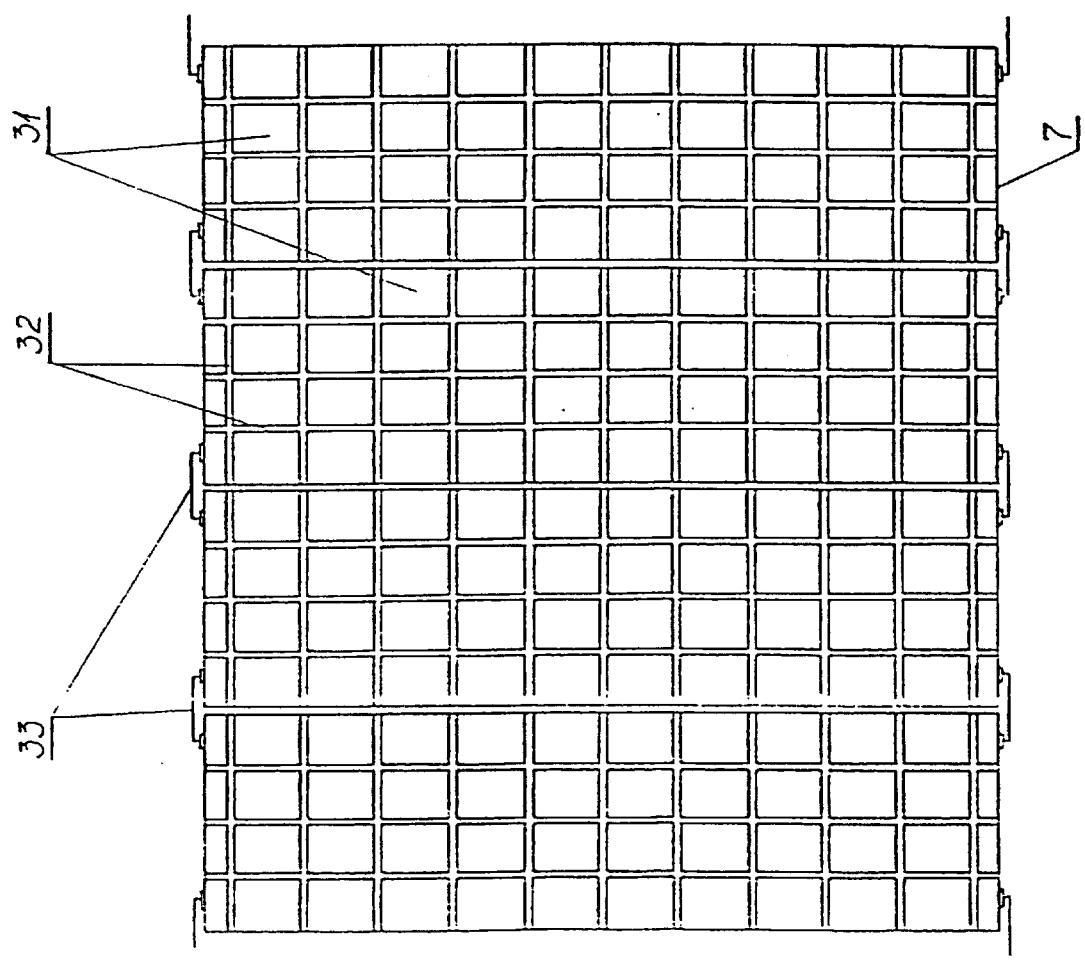
FIG. 6. View of the internal side of the continuous drain belt.

The belt filter 1 (FIGS. 1 and 2) consists of a feed container 2, filter sector 3 and thickening cone 9.

The filter sector 3 (FIGS. 1–4) is located under the feed container 2, and the thickening cone 9 is connected in its upper portion to filter sector 3. The bottom part of the thickening cone 9 (FIG. 1) is connected by a fixing unloading pipe 10, pipe 11, a combined vacuum-pressure pump 12 and a feed pipe 67, to the elastic thermo-filter press 35.

The filter sector 3 (FIGS. 1–4) is connected by an outlet vacuum pipe 18, a vacuum collector 19 and a main vacuum pipe 60 to a main vacuum pump 59. The filter sector 3 is connected at its other side by a reducing pipe 28, a pressure pipe 107, a second combined vacuum-pressure pump 104, a second vacuum collector 72 and a thermo-fluid detector 50 to the elastic thermo-filter press 35.

The filter sector 3 (FIGS. 1–4) consists of a robust frame 4 which houses a perforated absorption chamber 5, an elastic box 88 and a perforated drive drum 22. To the perforated absorption chamber 5 are mounted a gas inpenetrable sheathing 14 and a porous chamber partition 13. A basket 15 filled with absorbent 16 is located in the perforated absorption chamber 5. A sealed cover 17 is connected to the perforated absorption chamber 5.

A vacuum chamber 6 (FIGS. 3 and 4) is shaped by the porous chamber partition 13 and the gas inpenetrable sheathing 14. The vacuum chamber 6 is connected through the outlet vacuum pipe 18, the vacuum collector 19 and the main vacuum pipe 60 to the main vacuum pump 59.

A continuous drain belt 7 (FIGS. 3÷6) is laid on spacing rollers 34 upon the perforated absorption chamber 5 and the gas inpenetrable sheathing 14.

A belt screen 21 (FIGS. 3 and 4) is located above the gas inpenetrable sheathing 14, and is linked to the one side of the elastic box 88. The perforated drive drum 22 is located at the opposite side of the elastic box 88.

The perforated drive drum 22 (FIGS. 3 and 4) is connected to a second motor reducing gear 80. The perforated drive drum 22 is linked to the fixed hollow shaft 27 through second sealed bearings 102, and through sealed bearings 30 the perforated drive drum 22 is linked to the robust frame 4.

A fixed screen 24 (FIGS. 3 and 4) with a horizontal screen slit 25 is mounted concentrically into the interior of the perforated drive drum 22. The fixed hollow shaft 27 is linked in sequence by its one side through the reducing pipe 28, the pressure pipe 107, the second combined vacuum pressure pump 104, the second vacuum collector 72 and the thermo-fluid detector 50 to the elastic thermo-filter press 35. The fixed hollow shaft 27 is blind in its second end and is fixed by a second fixed connection 101 to the robust frame 4.

The elastic box 88 (FIGS. 3 and 4) consists of a frame 90, a solid sliding arch 89 and two semi-free sliding arches 91 mounted one upon the other and suspended elastically by their opposite sides to the elastic box 88. A jack 94 is mounted between the frame 90 and under the semi-free sliding arches 91. A supporting component 93 is mounted under the semi-free sliding arches 91, and the supporting component 93 is linked to the upper part of the jack 94.

The continuous filter belt 8 (FIGS. 3, 4) embraces in succession the continuous drain belt 7, the belt screen 21, the elastic box 88 and the perforated drive drum 22. Magnetic filaments 97 are interwoven in the continuous filter belt 8. Rollers 79 second rollers 92 and cleaners 23 are located upon the external surface of the continuous filter belt 8. A magnetic detector 98 is fixed to the robust frame 4.

Figure 7:
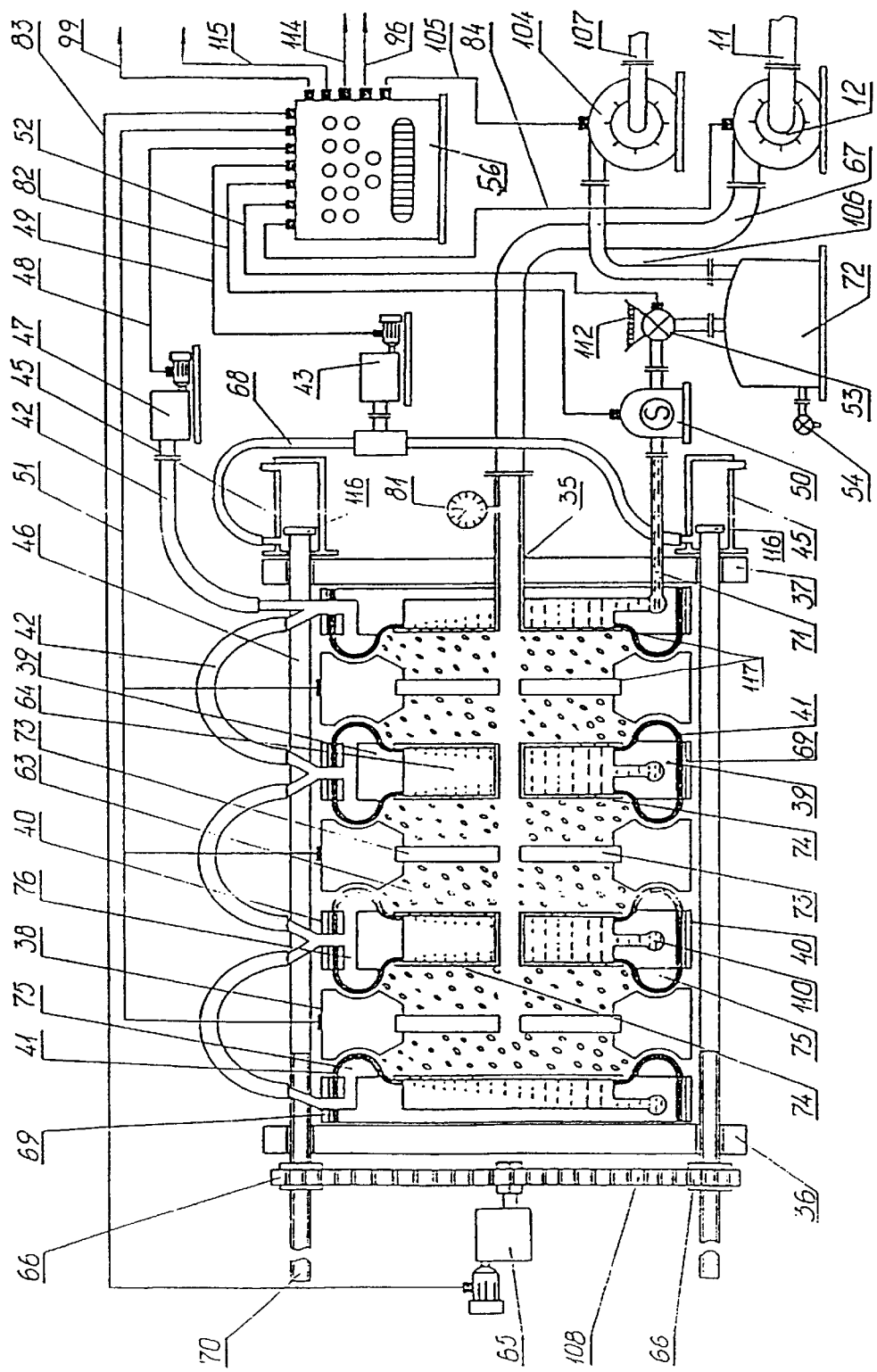
FIG. 7. Diagram of the transverse cross-section of the elastic thermo-filter press after closing the elastic thermo-filter press by the self-propelled head.
Figure 8:
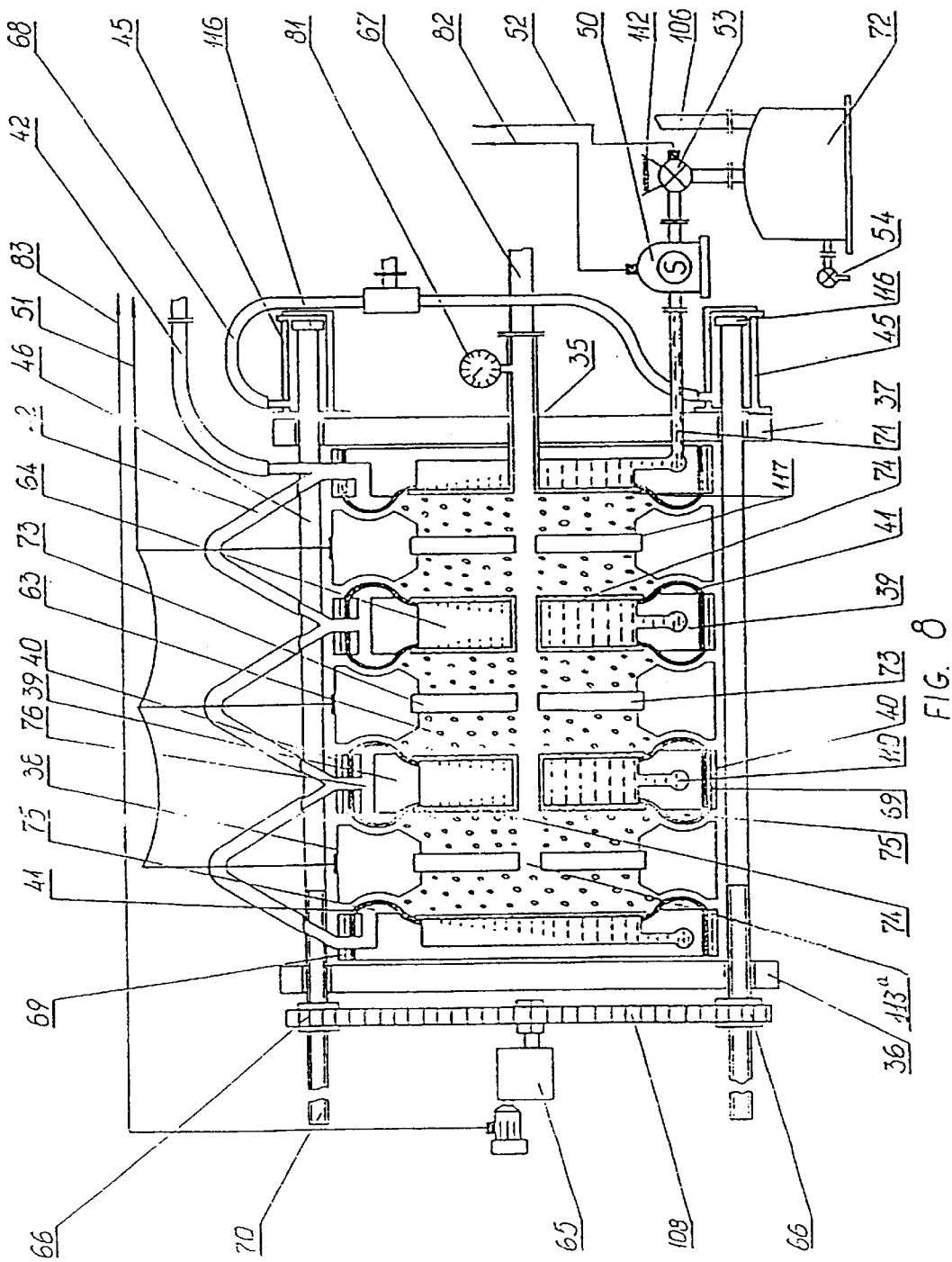
FIG. 8 Diagram of the transverse cross-section of the elastic thermo-filter press after longitudinal shrinkage of the elastic thermo-filter press by the action of the hydraulic cylinders.
Figure 9:
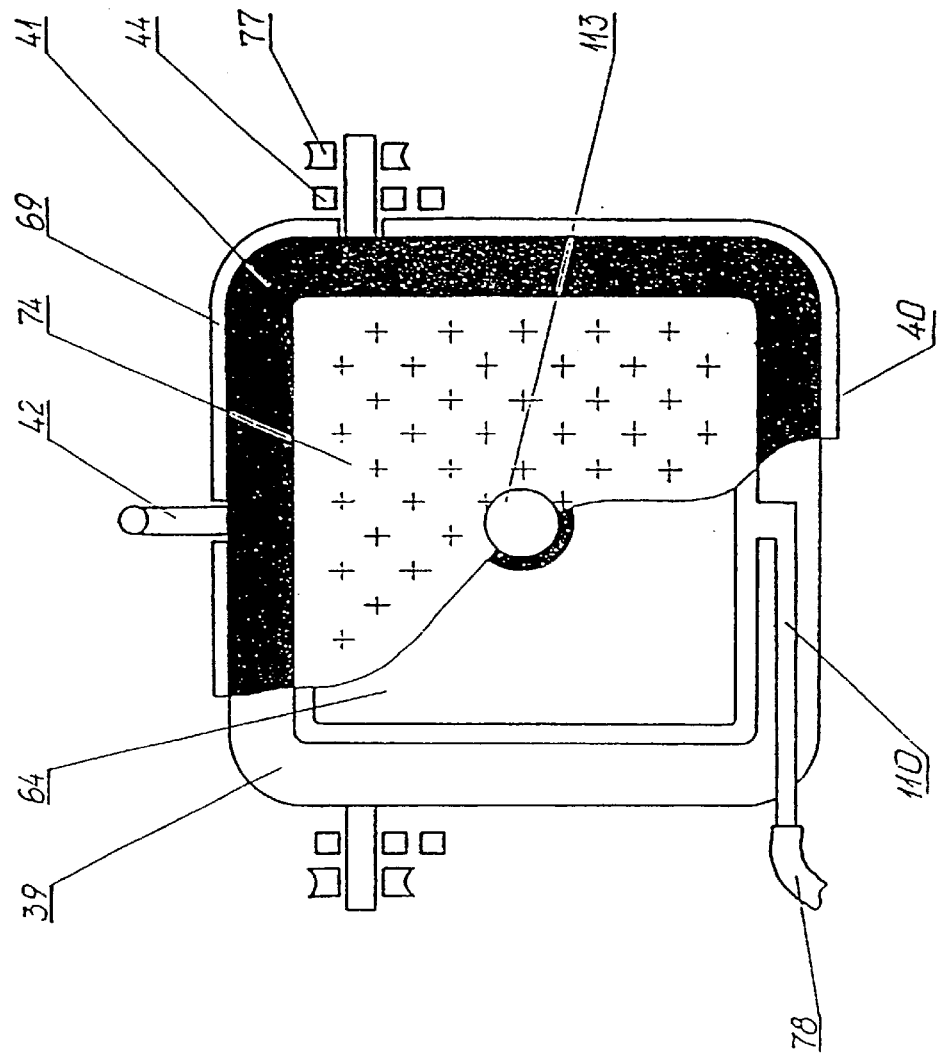
FIG. 9 Diagram of the elastic filter plates.
Figure 10:
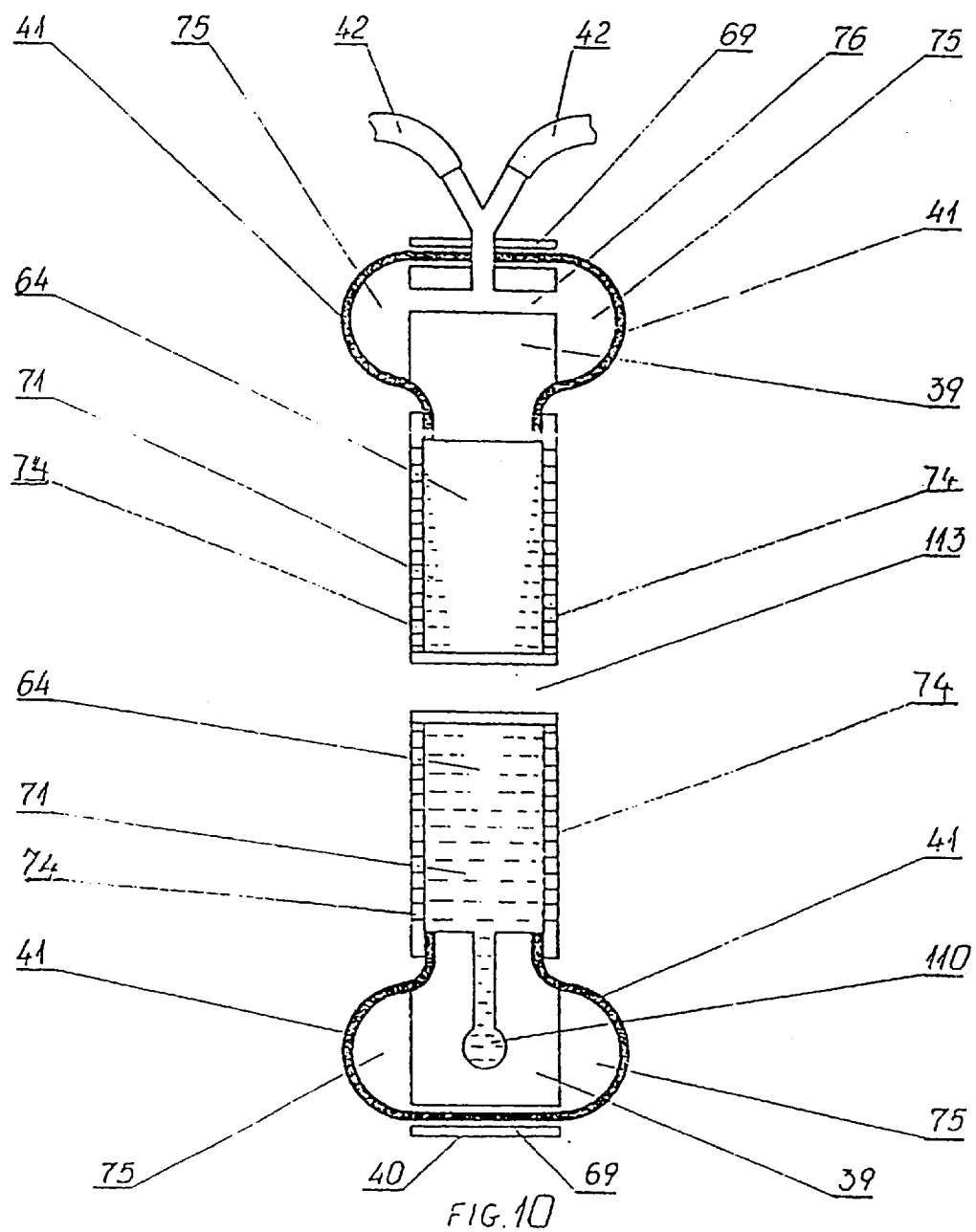
FIG. 10. Vertical cross-section of the elastic filter plates.
Figure 11:
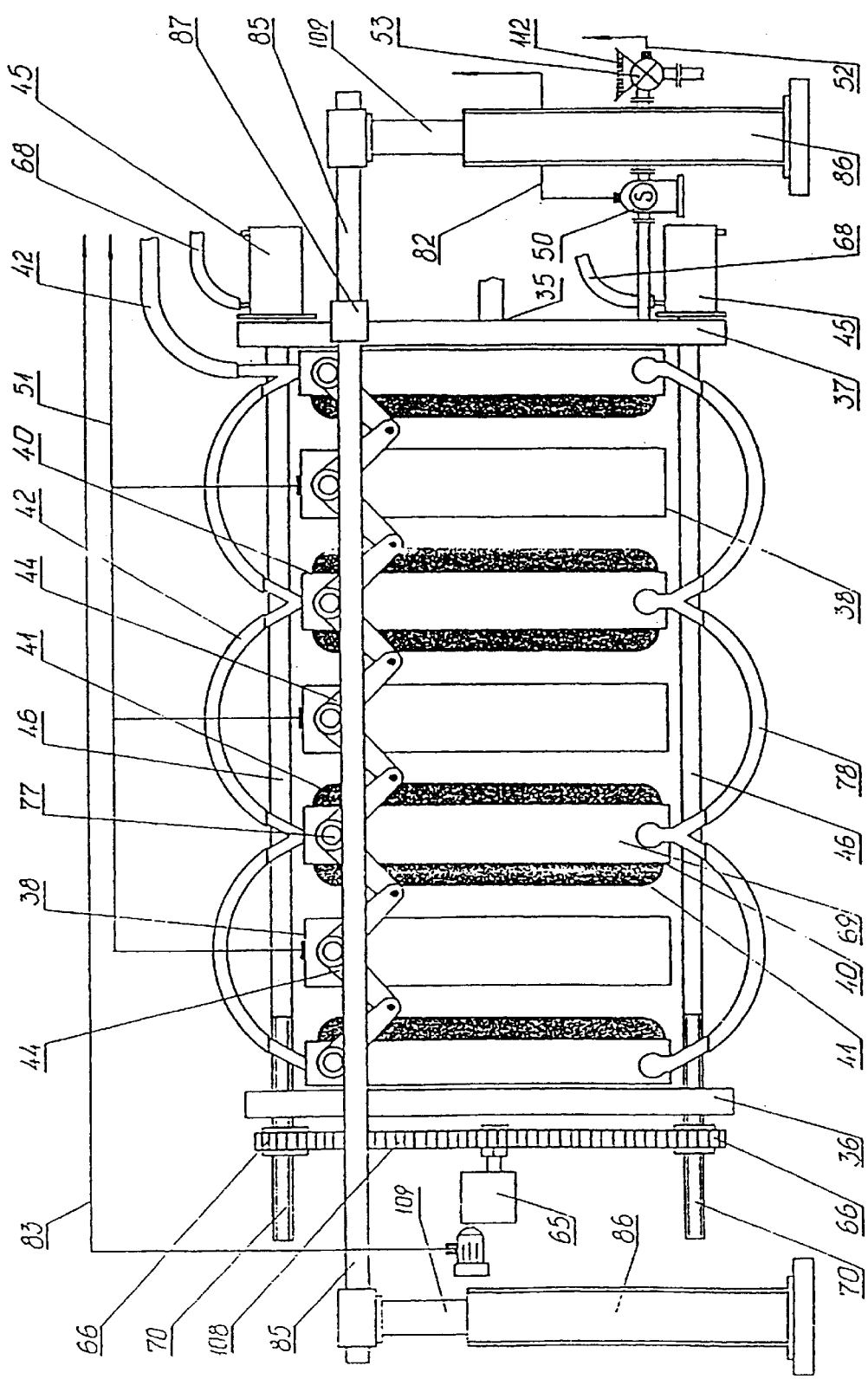
FIG. 11. General view of the elastic thermo-filter press in open position.

A control panel 56 (FIGS. 1 and 7) is connected to the combined vacuum pressure pump 12, to the second combined vacuum pressure pump 104, to the jack 94, to the magnetic detector 98, to the second motor reducing gear 80, to the air filter 112 which is connected to the second vacuum collector 72 and to a density detector 95, mounted in the thickening cone 9.

The elastic thermo-filter press 35 (FIGS. 1, 7, 8, 11) consists of elastic filter plates 40, aligned in sequence between heating plates 38 following each one after another. Elastic hollow conduits 75 are laid on both sides of internal frames 39 of the elastic filter plates 40. Heating membranes 73 with feed inlets 113$^a$ are mounted into the heating plates 38. A self-propelled head 36 is couples by guide nuts 66 to guide screws 70 located at the one end of robust stems 46 and at their other end the robust stems 48 are connected to pistons 116, lying in hydraulic cylinders 45. The hydraulic cylinders 45 are fixed to fixed head 37 and hydraulic pipes 68 are linking the hydraulic cylinders 45 to a hydraulic pump 43. The fixed head 37 is connected by fixed couplings 87 to supporting beams 85. The self-propelled head 36, the elastic filter plates 40, the thermo plates 38 and the fixed head 37 are interconnected by pivots 44. The elastic filter plates 40 are interconnected by flexible pipes 42. The flexible pipes 42 are connected to fluid pump 47. The elastic filter plates 40 are interconnected at their lower parts by flexible vacuum pipes 78. The flexible vacuum pipes are connected through the thermo-fluid detector 50, the second vacuum collector 72 to the second combined vacuum pressure pump 104.

The elastic filter plate 40 (FIGS. 1, 7, 8, 9, 11,) comprises an internal frame 39 and in the lower part of the internal frame 39 is located a vacuum duct 110. The vacuum duct 110 is connected in its external end to flexible vacuum pipes 78 and in its internal end it is connected to vacuum filter chamber 64 of the filter plate 40. The vacuum filter chamber 64 is limited by the internal frame 39 and two parallel porous partitions 74. A tube feed inlet 113 is located in the vacuum filter chamber 64 and in the porous partitions 74. The tube feed inlet 13 is connected to the combined vacuum pressure pump 12 by a feed pipe 67.

A fluid canal 76 is located in the internal flame 39. The fluid canal 76 is connected at its external end with flexible pipes 42, and the internal end of the fluid canal 76 is connected to the elastic hollow conduits 75. The internal frame 39 is embrace by elastic frame 41.

The elastic hollow conduits 75 are formed between the internal frame 39 and the elastic frame 41. Chambers with variable volume 117 are formed by the flexible filter plates 40, the heating plates 39 and the hollow conduits 75. The elastic hollow conduits 75 are located at the two parallel and vertical sides of the internal frame 39. The control panel 56 is connected to a motor reduction gear 65, to the heating membranes 73, to the fluid pump 47, to the hydraulic pump 43, to the thermo-fluid detector 50 and to a control valve 53.

MANNER OF OPERATION

The apparatus of the invention operates as follows:

The liquid to be purified 62 comprising basically industrial and household waste liquids, or water from natural water sources, is permanently fed into a feed container 2 of a belt filter 1 whilst the liquid is maintained at a constant level.

By action of hydrostatic pressure and vacuum, the liquid to be purified 62 is filtered through a continuous filter belt 8 and through a continuous drain belt 7 flows in a perforated absorption chamber 5.

In the perforated absorption chamber 5 a basket 15 is located, filled by absorbing substance 16, selectively catching any detrimental ion components.

The liquid to be purified 62, after passing through the continuous filter belt 8, the continuous drain belt 7 and the absorbing substance 16, flows out as purified liquid 61.

Then, by the action of hydrostatic pressure and vacuum from a main vacuum pump 59, the purified liquid 61 is passed through a porous chamber partition 13 into a vacuum chamber 6 and through an outlet vacuum pipe 18 is then fed into a vacuum collector 19.

An ozonizer 57 with ozonizing nozzle 20 is mounted to the outlet vacuum pipe 18 and ensures additional bacterial sterility. Thus the purified liquid 61 is accumulated in the lower portion of a vacuum collector 19 and is regularly removed through the purified liquid valve 58.

Vacuum in the vacuum collector 19 is maintained by the main vacuum pump 59 through a main vacuum pipe 60.

When the absorbing substance 16 becomes saturated with detrimental ion components, a sealed cover 17 opens, and the absorbing substance 16 is replaced by a fresh portion.

The continuous filter belt 8 is driven by a perforated drive drum 22.

The continuous filter belt 8 is sliding upon the surfaces of a solid sliding arch 89 and half-free sliding arches 91 forming together a flexible box 88, and upon the surface of a belt screen 21. The continuous filter belt 8 drives a continuous drain belt 7 adhering tightly to its surface.

The continuous drain belt 7 is rotated upon the perforated absorption chamber 5 and a gas impenetrable sheathing 14 by means of spacer rolls 34, mounted under the lamellae 31 of the continuous drain belt 7.

The filtered liquid is drained through canals 32 of laminae 31 and flows out through spacer joints of the lamellae 31 formed by pivot connections 33, and the filtered liquid flows into the perforated absorption chamber 5.

Non-filtering solids 103 stick to the outer surface of the continuous filter belt 8 only at its portion where the continuous filter belt 8 gets into contact with the surface of the continuous drain belt 7.

Cleaners 23 are permanently separating the non-filtering solids 103 from the surface of the continuous filter belt 8 at the line where the continuous filter belt 8 is detached from the continuous drain belt 7, and at the line where the continuous filter belt 8 gets into contact with the surface of the perforated drive drum 22.

In filter sector 3, rollers 79 and secondary rollers 92 press the continuous filter belt 7 to the belt screen 21 and to the flexible box 88.

To the filter sector 3, horizontal supporting components 100 are mounted which are fixed to a robust frame 4 and support the perforated absorption chamber 5, the vacuum chamber 6, and the flexible box 88, thus ensuring their stability in the process of operation.

The half-free sliding arches 91 of the flexible box 88 are permanently straining the continuous filter belt 8 by means of a supporting segment 93, which supporting segment 93 is pressing the half-free sliding arches 91 by the action of a jack 94, mounted on a frame 90 of the flexible box 88 and the bottom part of the flexible box 88 is a solid arch 89.

A hydraulic jack connection 115 is linked to a control panel 56 and maintains the necessary tension of the continuous filter belt 8.

Magnetic fibres 97 are interwoven in the continuous filter belt 8 and are signaling to a magnetic detector 98 any changes of speed.

Thus, through a signal circuit 99 of the magnetic detector 98, the control panel 56 controls the speed of the continuous filter belt 8 and regulates it through the hydraulic jack connection 115 by eliminating the sliding (friction) between the continuous filter belt 8 and the perforated drive drum 22.

The perforated drive drum 22 is rotated by a second motor reductor gear 80 through a second chain 111.

The perforated drive drum 22 is linked through its internal side to a fixed hollow shaft 27 by secondary sealed bearings 102, and through its external side it is connected to the robust frame 4 by sealed bearings 30.

The second motor reductor gear 80 is power supplied and controlled by a cable line 114 of the control panel 56.

In the middle of the fixed hollow shaft 27 a nozzle 29 is located.

Through the nozzle 29, filtrate 71 or aerosol 26 are fed under pressure.

One end of the fixed hollow shaft 27 is blind and is fixed by means of a second fixed coupling 101 to the robust frame 4.

A fixed screen 24 screens the inside of the perforated drive drum 22 and is attached to the fixed hollow shaft 27.

A horizontal screen slit 25 of the fixed screen 24 gives shape to a wide and thin pressure jet of the filtrate 71 or the aerosol 26, cleaning the micropores of the continuous filter belt 8 from the non-filtering solids 103.

Thus the filtering capacity of the continuous filter belt 8 is practically preserved for a long period of operation.

It is clear from the aforesaid that the liquid to be filtered 62 is permanently fed into the feed container 2 of belt filter 1, and the purified liquid 61 is permanently separated from vacuum chamber 6.

The non-filtering solids 103 collected upon the continuous filter belt 8 are mixed with the fed liquid to be purified 62 and the mixture (slurry) thus obtained is continuously thickened.

The increasing thickness is permanently controlled by a density detector 95 connected through a second signal line 96 to the control panel 56.

When the desired density is reached, an elastic thermo-filter press 35 is included in the dewatering and drying process of the thickened mixture (slurry) in the belt filter 1 only when the control panel 56 activates a fluid pump 47 through a first operating line 48.

Through flexible pipes 42 and fluid ducts 76 the fluid pump 47 compresses fluid into elastic hollow conduits 75 formed by elastic frames 41 and internal frames 39 of elastic filter plates 40.

The elastic hollow conduits 75 are located on the two parallel sides of the internal frame 39, Robust rims 69 embrace the external portions of the elastic filter plates 40.

The flexible hollow conduits 75 expand to a predetermined size under the impact of fluid pump 47.

When the predetermined size and pressure are reached, the control panel 56 stops the fluid pump 47 and activates, through a third operating line 83 a motor reductor gear 65, and by means of chain 108 and drive nuts 66 moves a self-propelled head 36 along guide screws 70 formed at the one end of robust stems 46.

The motor-reductor gear 65 is switched off automatically whenever the self-propelled head 36 closes the elastic thermo-filter press 35.

The expanded hollow conduits 75 ensure a tight and reliable contact between the flexible filter plates 40 and heating plates 38.

The expanded hollow conduits 75 predetermine the desired thickness of the cake 63 accumulated in the chambers with variable volume 117.

Whenever the elastic thermo-filter press 35 is closed, the control panel 56 activates a combined vacuum and pressure pump 12 through a fourth operating line 84.

The combined vacuum and pressure pump 12 draws out the thickened mixture (slurry) from the bottom of a thickening cone 9 through a fixing unloading pipe 10 and a pipe 11.

The thickened mixture (slurry) is then compressed through a feed pipe 67 and a tube feed inlet 113 into the chambers limited by the elastic filter plates 40 and the heating plates 38.

The filtrate 71 is separated by porous partitions 74 under the pressure produced by the combined vacuum and pressure pump 12 and the vacuum developed in vacuum filter chambers 64 by a second combined vacuum pressure pump 104 linked through a fifth operating line 105 to the control panel 56.

From the vacuum filter chambers 64, the filtrate 71 flows through vacuum ducts 110, vacuum flexible pipes 78 and a thermo-fluid detector 50 into a second vacuum collector 72.

The filtrate 71 can be regularly let out by a filtrate valve 54.

The filtrate 71 can also be pumped out by the second combined vacuum pressure pump 104 through a second feed pipe 106 and through a pressure pipe 107, a reducing pipe 28, the fixed hollow shaft 27, and the nozzle 29, to be fed into the perforated drive drum 22.

The filtration process is controlled by the thermo-fluid detector 50, and through a thermo-fluid detector connection 82 the filtration processed is recorded by the control panel 56.

After the completion of the filtration process, the control panel 56 activates a hydraulic pump 43 through a second operating line 49.

The hydraulic pump 43 activates hydraulic cylinders 45 through hydraulic pipes 68.

The activation of the hydraulic pump 43 makes the control panel 56 set into operation heating membranes 73 of the heating plates 38 through a power supply cable 51.

Around the surface of the heating membranes 73 a process of evaporation of the residual liquid phase begins, leading to the formation of a "steam jacket".

Simultaneously with the activation of the hydraulic pump 43, the control panel 56 starts the switched-off the fluid pump 47 through the first operating line 48, and at this stage the fluid pump 47 lowers the pressure in the flexible pipes 42 which results in a gradual shrinking of the elastic hollow conduits 75.

The hydraulic cylinders 45 mounted on a fixed head 37 pull out, under the effect of the pressure of the hydraulic pump 43, pistons 116 of the hydraulic cylinders 45. The pistons 116 are connected to the second ends of the robust stems 46.

Thus the distance between the self-propelled head 36 and the fixed head 37 is decreased, i.e. the elastic thermo-filter press 35 contracts longitudinally.

As a result of the contraction under the effect of the hydraulic cylinders 45, the volume of the cake 63 accumulated in the chambers with variable volume 117 begins to compress and shrink.

Thus the second stage of dewatering begins, accompanied by partial evaporation.

During the second stage, the residual liquid phase in the capillaries of the cake 63 is filtered through the porous partitions 74 into the vacuum-filter chambers 64 under the simultaneous effect of:

the vapours of the "steam jacket" formed on the surface of the heating membranes 73 which push out the capillary liquid phase;

the mechanical pressing and squeezing of the cake 63 under the impact of the hydraulic cylinders 45; and the vacuum developed by the second combined vacuum pressure pump 104.

The residual liquid phase entering by filtration into the vacuum filter chambers 64, is practically the aerosol 26 comprising: liquid, steam and air.

The aerosol 26 flows further through the thermo-filter detector 50, the second vacuum collector 72, the second feed pipe 106, the second combined vacuum and pressure pump 104, the pressure pipe 107, the reducing pipe 28, the fixed hollow shaft 27, the nozzle 29, the horizontal screen slit 25; and through the perforated drive drum 22 the aerosol 26 cleans the micropores of the continuous fitter belt 8 and then the aerosol 26 is mixed with the liquid fed to be purified 62 in the belt filter 1.

Thus, the thermal energy accumulated in the aerosol 26, imparted by the heating membranes 73 of the heating plates 38, is conveyed with negligible losses to the liquid fed to be purified 62.

The second stage of dewatering is completed with the end of aerosol separation, i.e. the cake 63 is dewatered and dried to a maximum.

Separation of the aerosol 26 is controlled by the thermo-fluid detector 50, and the signal obtained is fed to the control panel 56 through the thermo-fluid detector connection 82.

At the end of the second stage, the control panel 56 issues a signal for:

the switching off of the hydraulic pump 43;

the switching off of power supply cable 51 to the heating membranes 73;

the switching on of the self-propelled head 36, which opens the elastic thermo-filter press 35, and thus increases the distance between the elastic filter plates 40 and the heating plates 38 interconnected by pivots 44;

the switching on of vibrating stems 109 located in the supporting columns 86.

The vibrations of the vibrating stems 109 are imparted through supporting beams 85 and the supporting rolls 77, to the elastic filter plates 40 and the heating plates 38 suspended on the supporting beams 85.

In result of the effect of vibrations, the dewatered and dried cake 63 is disconnected from the heating plates 38 and the elastic filter plates 40, and falls into an appropriate hopper.

The fixed head 37 is connected by a fixed coupling 87 to the supporting beams 85.

A manometer 81 indicates the pressure in the chambers of the elastic thermo-filter press 35.

The thickening cone 9 can be cleaned regularly by removing a thickening cover 55.

The belt filter 1 can be equipped with two or more filter sectors 3.

After the discharge of the cake 63, the elastic thermo-filter press 35 is ready for the next working cycle. The start of the next working cycle is determined by the moment when the density of the resulting mixture of non-filtering solids 103 and the liquid to be purified 62 flowing into the belt filter 1, reaches a predetermined value.

The time interval from the end of one cycle until the beginning of the following cycle varies within a wide scope depending on the characteristics and volume of the liquid to be purified 62.

When the elastic thermo-filter press 35 is engaged and operates only with the belt filter 1, its production capacity may remain to a great extent unused.

In such cases, it is economically efficient to link one elastic thermo-filter press 35 with two or more belt filters 1 in the process of operation, or to build in two or more filter sectors 3 in one belt filter 1.

The belt filter 1 and the elastic thermo-filter press 35 can function separately as two apparatuses independent from each other.

When the belt filter 1 operates independently, a control valve 53 connected to the control panel 56 through a control line 52 switches off the thermo-fluid detector 50 and switches the air filter 112.

In this case, the second combined vacuum and pressure pump 104; compresses air into the perforated drive drum 22, and this air cleans the micro pores of the continuous filter belt 8.

The thickened mixture of non-filtering solids 103 and the inflowing liquid to be purified 62 is brought out by the thickening cone 9 by the action of the combined vacuum and pressure pump 12 after reaching the predetermined value of density (thickening).

The elastic thermo-filter press 35 can operate independently by being supplied from various sources with mixtures of liquids containing dispersed solids (slurry mass).

The supply to the elastic thermo-filter press 35 is performed by the combined vacuum and pressure pump 12.

The control valve 53 disconnects the air filter 112.

The filtrate 71, by the action of the second combined vacuum and pressure pump 104, is collected through the thermo-filter detector 50 into the second vacuum collector 72.

Although the invention is described and illustrated with reference to a plurality of embodiments therefore, it is to be expressly understood that it is in no way limited to the disclosure of such preferred embodiments, but is capable of numerous modifications within the scope of the appended claims.

I claim:

1. Apparatus for continuous purification of liquids, dewatering and drying of the separated solids, comprising a belt filter and an elastic thermo-filter press, said belt filter including a feed for liquids to be purified and a filter sector comprising a continuous filter belt and which at its bottom is connected to a thickening cone for thickening the solids separated by the continuous filter belt, said filter sector being connected to a pipe including a pump for discharge of purified liquid, said thickening cone being connected through a feed pipe including a combined vacuum pressure pump to said elastic thermo-filter press for delivering thickened mixture from the thickening cone to the elastic thermo-filter press, wherein the elastic thermo-filter press is connected through a return line for delivering filtrate resulting from the operation of the thermo-filter press to the belt filter.

2. Apparatus according to claim 1, wherein the elastic thermo-filter press comprises a plurality of elastic filter plate assemblies arranged parallel to each other in axial series and a plurality of heating plates being arranged in between the filter plate assemblies and having heating membranes mounted thereon and extending into the space formed between consecutive filter plates, said filter plate assemblies having internal frames extending thereabout, the internal frames having two axial sides, and encompassed by an elastic frame so that on both axial sides of said internal frames elastic hollow conduits are formed and two parallel porous partitions defining filter chambers for the filtrate together with the internal frames, chambers with variable volume being formed between the filter plates, with the elastic hollow conduits and the heating plates for the thickened mixture.

3. Apparatus according to claim 2, wherein each said filter chamber is in fluid communication with vacuum ducts arranged in the lower part of the internal frames, said filter chambers being connected to each other through said vacuum ducts to flexible vacuum pipes forming part of said return line, said filter plate assemblies and said heating membranes having feed inlets, passing therethrough and being in fluid communication with said feed pipe, said elastic hollow conduits being connected by flexible pipes to each other and to a fluid pump for keeping the elastic hollow conduits pressed against the heating plates into contact therewith.

4. Apparatus according to claim 2, wherein said thermo-filter press has two ends and has a driven head on one end and a fixed head on the other end, said heads extending parallel to said elastic filter plate assemblies, said filter plate assemblies and said heating plates being suspended by supporting rollers on support beams so as to be movable therealong, said driven head, said filter plate assemblies and said heating plates and said fixed head being interconnected by pivots.

5. Apparatus according to claim 4, wherein said driven head is coupled by means of guide nuts to guide screws located at one end of stems, wherein said drive nuts are driven by means of a chain and a motor reduction gear for driving said driven head for opening and closing said thermo-filter press.

6. Apparatus according to claim 5, wherein said robust stems are connected at their other end with pistons, said pistons lying in hydraulic cylinders which are fixed to said fixed head, wherein said hydraulic cylinders are coupled by hydraulic pipes to a hydraulic pump, said fixed head being connected by fixing couplings to said support beams.

7. Apparatus according to claim 6, wherein said hydraulic pump for the hydraulic cylinders, the fluid pump for the elastic hollow conduits, said motor reduction gear and the heating membranes are operatively connected to a control panel.

8. Apparatus according to claim 7, wherein a thermo-fluid detector is included in the return line and is connected by a thermo-fluid detector connection to said control panel.

9. Apparatus according to claim 8, wherein downstream of said thermo-fluid detector said return line comprises a vacuum collector provided with a filtrate valve, a feed pipe, a vacuum pump and a pressure pipe.

10. Apparatus according to claim 8, wherein said vacuum collector is provided with a control valve connected to said control panel and being positioned between an air filter and said vacuum collector as well as between said thermo-fluid detector and said vacuum collector.

11. Apparatus according to claim 1, wherein said continuous filter belt is arranged in a first frame for being immersed in the liquid to be purified.

12. Apparatus according to claim 11 wherein said continuous filter belt comprises a continuous drain belt which can be driven and is supported on spacer rolls and is located outside of a gas impermeable sheeting of a perforated absorption chamber in which a basket for containing coarse solids is mounted, wherein a vacuum chamber is separated from said absorption chamber by a porous chamber partition and is further delimited by said gas impermeable sheeting, said vacuum chamber being in fluid communication with said pipe and a vacuum pump for discharge of purified liquid.

13. Apparatus according to claim 12, wherein a perforated drive drum is arranged in said first frame at a distance from said absorption chamber, said drive drum being for driving said continuous filter belt about said drum and said chambers, wherein said drive drum is perforated and has a fixed screen located therein which is provided with a slit and which is in fluid communication with said return line and which delivers filtrate or aerosol though said perforations into the filter section.

14. Apparatus according to claim 12, wherein between said chambers and said driven drum an elastic box is arranged, which has a second frame, a solid sliding arch and two semi-free sliding arches mounted one upon the other and suspended elastically by their opposite sides to the elastic box, wherein a jack is mounted between said second frame and said semi-free sliding arches and a supporting component is located under said semi-free sling arches and is connected to the upper portion of said jack, wherein said continuous filter belt embraces in succession said continuous drain belt, said elastic box and said perforated driving drum.

15. Apparatus according to claim 14, wherein a belt screen is located above said gas impermeable sheeting and is connected to one side of the elastic box.

16. Apparatus according to claim 12, wherein magnetic fibers are interwoven in said continuous filter belt and said first frame is provided with a magnetic detector fixed into said first frame.

17. Apparatus according to claim 12, wherein said thickening cone is provided with a density detector.

18. Thermo-filter press for a thickened mixture or slurry comprising a plurality of filter plate assemblies arranged parallel to each other in series and a plurality of heating plates being arranged in between the filter plates and having heating membranes mounted thereon and extending into the space formed between consecutive filter plate assemblies, said filter plate assemblies defining filter chambers being in fluid communication with an outlet for the filtrate, said filter plate assemblies being provided with flexible hollow conduits at their circumferential edges, said heating plates and said filter plate assemblies with their flexible hollow conduits forming chambers with variable volume for the mixture or slurry.

19. Press according to claim 18, comprising an inlet and an outlet, said heating plates having heating membranes mounted thereon and extending into the space formed between consecutive filter plate assemblies, said filter plate assemblies having internal frames extending thereabout and encompassed by an elastic frame so that on both of opposite sides of said internal frame said elastic hollow conduits are formed and two parallel porous partitions defining said filter chambers for the filtrate together with the internal frames, wherein said filter chambers are in communication with said outlet and said chambers are in communication with said inlet.

20. Press according to claim 18, wherein each said filter chamber is in fluid communication with vacuum ducts arranged in the lower part of the internal frames, said filter chambers being connected to each other through said vacuum ducts to flexible vacuum pipes communicating with said outlet, said filter plate assemblies and said heating membranes having feed inlets, passing therethrough and being in fluid communication with said inlet, said elastic hollow conduits being connected by flexible pipes to each other and to a fluid pump for keeping the elastic hollow conduits pressed against the heating plates into contact therewith.

21. Press according to claim 18, wherein said thermo-filter press has a driven head on the one side and a fixed head on the other side, said heads extending parallel to said filter plate assemblies, said filter plate assemblies and said heating plates being suspended by supporting rollers on support beams so as to be movable therealong, said driven head, said filter plate assemblies and said heating plates and said fixed head being interconnected by pivots.

22. Press according to claim 21, wherein said driven head is coupled by means of guide nuts to guide screws located at the one end of stems, wherein said drive nuts are driven by means of a chain and a motor reduction gear for driving said driven head for opening and closing said thermo-filter press.

23. Press according to claim 21, wherein ends of said stems opposite the ends with guide screws are connected with pistons, said pistons lying in hydraulic cylinders which are fixed to said fixed head, wherein said hydraulic cylinders are coupled by hydraulic pipes to a hydraulic pump, said fixed head being connected by fixing couplings to said support beams.

24. Press according to claim 23, wherein said hydraulic pump for the hydraulic cylinders, the fluid pump for the elastic hollow conduits, said motor reduction gear and the heating membranes are operatively connected to a control panel.

25. Press according to claim 24, wherein a thermo-fluid detector is included in a return line connected to the outlet and is connected by a thermo-fluid detector connection to said control panel.

26. Press according to claim 25, wherein downstream of said thermo-fluid detector said return line comprises a vacuum collector provided with a filtrate valve, a feed pipe, a vacuum pump and a pressure pipe.

27. Press according to claim 25, wherein said vacuum collector is provided with a control valve connected to said control panel and being positioned between an air filter and said vacuum collector as well as between said thermo-fluid detector and said vacuum collector.

28. Belt filter including a feed container for liquids to be purified and a filter sector underneath said filter container comprising a continuous filter belt and which at its bottom is connected to a thickening cone for thickening solids separated by the continuous filter belt, said filter sector being connected to a pipe including a pump for discharge of purified liquid, said thickening cone having an outlet, wherein said continuous filter belt is arranged in a first frame for being immersed in the liquid to be purified.

29. Belt filter according to claim 28, wherein said continuous filter belt embraces a continuous drain belt which can be driven and is supported on spacer rolls and is located outside of a gas impermeable sheeting of a perforated absorption chamber in which a basket for containing coarse solids is mounted, wherein a vacuum chamber is separated from said absorption chamber by a porous chamber partition and is further delimited by said gas impermeable sheeting, said vacuum chamber being in fluid communication with said pipe and a vacuum pump for discharge of purified liquid.

30. Belt filter according to claim 29, wherein a perforated drive drum is arranged in said first frame at a distance from said absorption chamber, said drive drum being for driving said filter belt about said drum and said chambers, wherein said drive drum is perforated and has a fixed screen located therein which is provided with a slit and which is in fluid communication with an inlet for delivering filtrate or aerosol through said perforations into the filter sector.

31. Belt filter according to claim 30, wherein between said chambers and said driveup drum an elastic box is arranged, which has a second frame, a solid sliding arch and two semi-free sliding arches mounted one upon the other and suspended elastically by their opposite sides to the elastic box, wherein a jack is mounted between said second frame and said semi-free sliding arches and a supporting component is located under said semi-free sliding arches and is connected to the upper portion of said jack, wherein said continuous filter belt embraces in succession said continuous drain belt, said flexible box and said perforated driving drum.

32. Belt filter according to claim 31, wherein a belt screen is located above said gas impermeable sheeting and is connected to one side of the elastic box, wherein said belt screen preferably is located at the vacuum chamber.

33. Belt filter according to claim 29, wherein magnetic fibers are interwoven in said continuous filter belt and said first frame is provided with a magnetic detector fixed into said first frame.

34. Belt filter according to claim 29, wherein said thickening cone is provided with a density detector.

35. Method for continuous purification of a liquid and, dewatering and drying separated solids, wherein the liquid to be purified is fed into a filter sector in which a continuous filter belt is placed, filtered by said filter belt and passed through a drain belt and a perforated absorption chamber into an absorbing substance and from there through a porous partition into a vacuum chamber from which it is discharged as purified liquid, wherein the non-filtered solids of the liquid to be purified that are collected upon the filter belt are mixed with the liquid to be purified to thicken said liquid, said thickened liquid being collected in a thickening cone and being pumped out at a definite value of thickness to an elastic thermo-filter press where it is additionally filtered under the influence of vacuum, the resulting filtrate being fed back to the filter sector.

36. Method according to claim 35, wherein said continuous filter belt is kept immersed in the liquid to be purified.

37. Method according to claim 35, wherein the filter cake remaining in the elastic thermo-filter press is dewatered and dried by applying heat to a heating surface opposite a filtering surface of the elastic thermo-filter press in order to start around said heating surface a process of evaporation of a residual liquid phase leading to the formation of a "steam jacket" while simultaneously compressing the filter cake and applying vacuum at the opposite side of the filter surface, wherein the filtrate is used for cleaning the filter belt in the filter section and for heating the liquid in the belt filter.

38. Method according to claim 37, wherein the elastic thermo-filter press has a series of parallel arranged filter surfaces, wherein the compression of the filter cake takes place by decreasing the spacing between opposite filter surfaces while keeping the space between the opposite surfaces closed in sideward direction by means of elastic frames.

39. Method for the purification of a thickened slurry mixture, wherein the mixture is fed into press chambers defined by filter plate assemblies comprising, porous partitions and elastic hollow conduits and by heating plates positioned in between the filter assemblies, the porous partitions having a filter side and an opposite side, wherein the hollow conduits are expanded to ensure a tight and reliable contact between the filter plate assemblies and the heating plates and to expand the press chambers, wherein in a first filtering phase due to pressure difference the mixture is filtered at the filter side of the porous partitions and the filtrate is discharged at the opposite side of the porous partitions.

40. Method according to claim 39, wherein in a second filtering phase after said first filtering phase a filter cake is formed and the filter plate assemblies are urged towards one another to decrease the spacing bet ween the porous partitions while maintaining the contact between the elastic hollow conduits and the heating plates, while still discharging filtrate.

41. Method according to claim 40, wherein the pressure in the elastic hollow conduits is decreased gradually during the decrease of the spacing between the filter plate assemblies.

42. Method according to claim 40, wherein simultaneously the heating plates are activated to form a steam jacket on heating membranes forming part of the heating plates.

43. Method according to claim 42, wherein the second filtering phase is continued until the filter cake is dewatered and dried.

44. Method according to claim 43, wherein the porous partitions and the heating plates are vibrated to promote the separation of the dewatered and dried cake.

45. Method according to claim 40, wherein after the second filtering phase the distance between the filter plate assemblies and the heating plates is increased in order to open the chambers and to remove filter cake from the porous partitions and the heating plates.

* * * * *